US008266533B2

(12) United States Patent
Zacarias et al.

(10) Patent No.: US 8,266,533 B2
(45) Date of Patent: Sep. 11, 2012

(54) METHOD AND SYSTEM CONFIGURED TO ASSESS A FEE FOR COMMUNICATION FACILITATION REGARDING PUBLICATION INFORMATION

(75) Inventors: Arturo Manuel Zacarias, Cupertino, CA (US); Valerie K. Shirk, San Jose, CA (US); Erik Anderson Stuart, San Mateo, CA (US)

(73) Assignee: eBay Inc., San Jose, CA (US)

( * ) Notice: Subject to any disclaimer, the term of this patent is extended or adjusted under 35 U.S.C. 154(b) by 1256 days.

(21) Appl. No.: 11/744,349

(22) Filed: May 4, 2007

(65) Prior Publication Data

US 2008/0276180 A1 Nov. 6, 2008

(51) Int. Cl.
*G06F 3/00* (2006.01)
(52) U.S. Cl. ......... 715/751; 715/760; 715/758; 715/748
(58) Field of Classification Search ................... 715/751, 715/760, 758, 748
See application file for complete search history.

(56) References Cited

U.S. PATENT DOCUMENTS

| 2003/0018575 | A1* | 1/2003 | Beggins et al. ............... 705/38 |
| 2003/0061179 | A1* | 3/2003 | Reece ........................... 705/412 |
| 2006/0156022 | A1* | 7/2006 | Grim et al. .................... 713/182 |
| 2006/0178896 | A1* | 8/2006 | Sproul ............................. 705/1 |
| 2007/0022011 | A1* | 1/2007 | Altberg et al. ................. 705/14 |
| 2007/0081649 | A1* | 4/2007 | Baudino et al. .......... 379/201.11 |
| 2007/0160035 | A1* | 7/2007 | Altberg et al. ................ 370/352 |

* cited by examiner

*Primary Examiner* — Michael Roswell
(74) *Attorney, Agent, or Firm* — Schwegman Lundberg & Woessner, P.A.

(57) ABSTRACT

A method and system are configured to assess a fee for communication facilitation regarding publication information. An electronic publication system includes a publication module configured to generate a user interface based on an information search. The user interface includes search result information associated with a first entity and communication initiation information associated with the first entity. The communication initiation information includes identification information configured to identify a contact module of the first entity. The communication initiation information is configured to be selectable to facilitate communication between a second entity and the first entity. The publication system also includes a receiving module configured to receive a lead data record from a communication system that facilitates communication between the first entity and a second entity via the contact module upon selection of the communication initiation information generated from the publication module. The publication system also includes a fee assessment module configured to receive the lead data record from the receiving module and to assess a fee to the first entity based on the lead data record.

22 Claims, 5 Drawing Sheets

SELLER OF THIS ITEM? SIGN IN FOR YOUR STATUS

CLASSIFIED AD PRICE   US $45.00

LOCATION   SANJOSE, CA, UNITED STATES

CONTACT INFO.
- 45 — (800)555-1212 CALL — 46
- 47 — EMAIL THE SELLER — 44
- 48 — CHAT WITH THE SELLER

OFFICE HOURS   9:00AM – 5:00PM PST

LIST DATE   JUN-04-06 06:44:35 PDT

YOU CAN ALSO   [WATCH THIS ITEM]

ADD NOTES | EMAIL TO A FRIEND | SELL ONE LIKE THIS

THIS LISTING IS A CLASSIFIED AD. THERE IS NO BIDDING. IF YOU ARE INTERESTED IN THIS ITEM, YOU MAY CONTACT THE SELLER TO REQUEST ADDITIONAL INFORMATION.

VIEW LARGER PICTURE

LISTING DETAILS: HIDE
DURATION: 14 DAYS
END TIME: JAN. 18 0505:44 PDT

METHOD AND SYSTEM CONFIGURED TO ASSESS A FEE FOR COMMUNICATION FACILITATION REGARDING PUBLICATION INFORMATION

TECHNICAL FIELD

This application relates generally to the technical field of electronic communications.

BACKGROUND

Responsive to viewing published information (e.g., search results or an advertisement), a consumer may wish to initiate contact with an entity associated with the published information. For example, where the published information is an article or a listing describing a product or service, a consumer may wish to contact the seller to obtain further details regarding the product or service, or to negotiate for the purchase of the goods or services. Similarly, where the published information is an advertisement, a consumer may wish to initiate contact with the seller that has posted the advertisement.

Consumers are often discouraged from initiating such contact because of the effort required. For example, the contact process may require the consumer to look up the telephone number or email address of the seller, and then to manually dial the telephone number (or type in the email address) for the purpose of initiating communications.

BRIEF DESCRIPTION OF DRAWINGS

Example embodiments are illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of example embodiments. It may be evident, however, to one skilled in the art that the present disclosure may be practiced without these specific details.

In an embodiment, A method and system are configured to assess a fee for communication facilitation regarding publication information. An electronic publication system includes a publication module configured to generate a user interface based on an information search. The user interface includes search result information associated with a first entity and communication initiation information associated with the first entity. The communication initiation information includes identification information configured to identify a contact module of the first entity. The communication initiation information is configured to be selectable to facilitate communication between a second entity and the first entity. The publication system also includes a receiving module configured to receive a lead data record from a communication system that facilitates communication between the first entity and a second entity via the contact module upon selection of the communication initiation information generated from the publication module. The publication system also includes a fee assessment module configured to receive the lead data record from the receiving module and to assess a fee to the first entity based on the lead data record.

In an embodiment, a communication system facilitates communication between the first entity and a second entity via the contact module upon selection of the communication initiation information. The communication system tracks the communication between the entities as a lead data record. The communication system sends the lead data record to the publication system, which assesses a fee to the first entity based on the lead data record.

Figure 1:
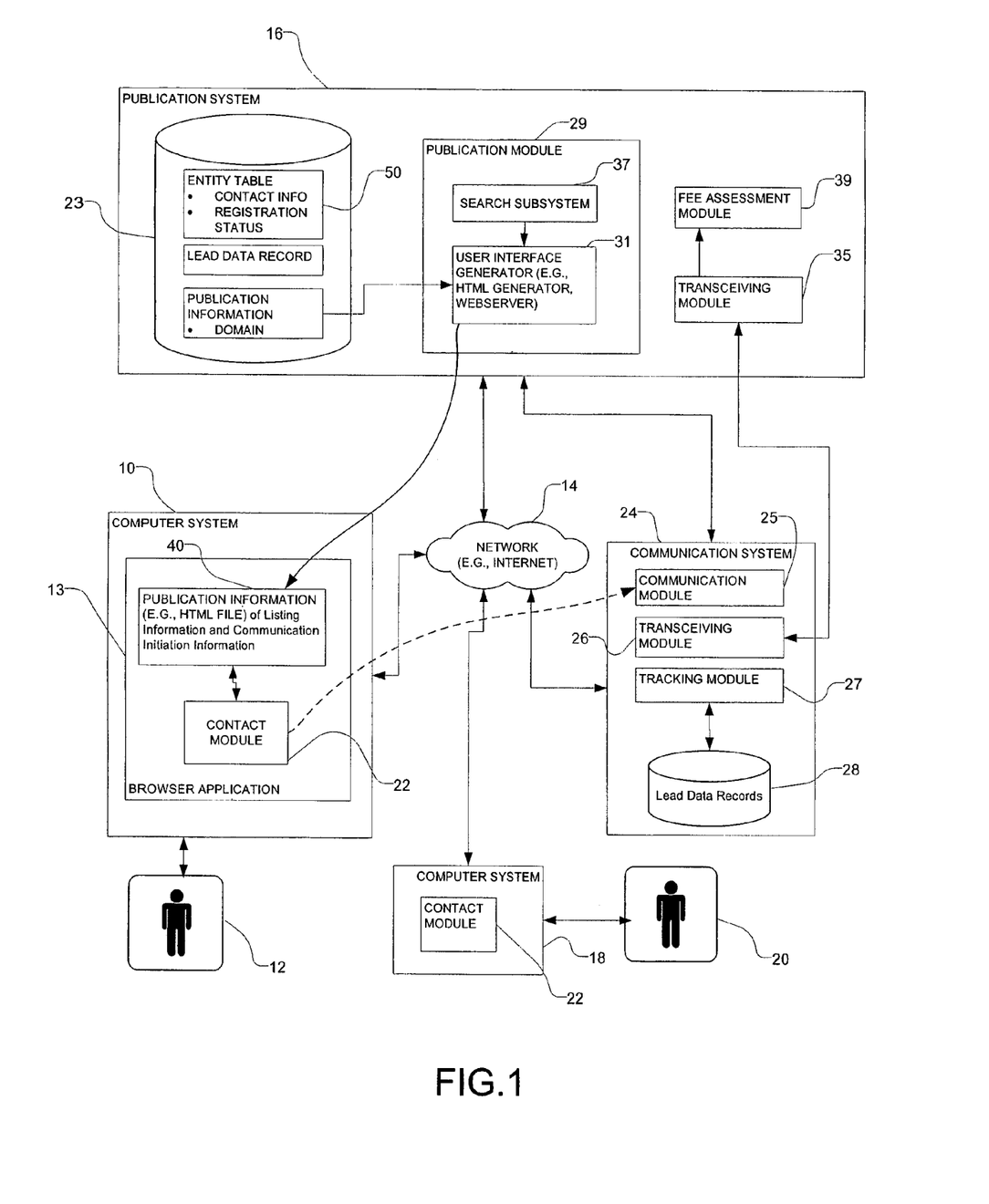
FIG. 1 is a system diagram, according to an embodiment, illustrating computer systems, a network, a publication system, and a communication system.

FIG. 1 is a system diagram, and illustrates a computer system 10 (e.g., client computer or other networked device) utilized by an entity (e.g., viewing user 12) to access a network 14 (e.g., the Internet) to thereby communicate with a publication system 16, as well as computer systems 18 (e.g., client computer or other networked device) of other users or entities (e.g., a publishing user 20) that may publish information utilizing the publication system 16. It may be appreciated that the entity described above need not be embodied as a human user and may be embodied as a software agent. For example, the software agent may be embodied as bookfinder.com of Berkley, Calif. or as mySimon made by CNET Networks, Inc. It may further be appreciated that a human user is not limited to interacting with another human user but may interact with a software agent.

The computer system 10 (e.g., client computer) is shown to host a client module, in the example form of a browser application 13 (e.g., MS Internet Explorer, or FireFox browser), and a contact module 22. The contact module 22 may include a Voice over Internet Protocol contact module for VoIP communications, an electronic message contact module for email communications, a URL web site contact module for web page communications, and an instant message contact module for IM communications. In each instance, communication information may be selectable to initiate the respective type of communication.

The publication system 16 includes a database 23 and a publication module 29 that hosts a user interface generator 31 (e.g., HTML Generator) and a search subsystem 37. The publication system 16 also may include a transceiving (or receiving) module 35 to communicate with communication system 24 and to receive lead data record(s) from the communication system 24, and a fee assessment module 39 to assess a fee based on the lead data record, including communication options and selections.

Figure 2:
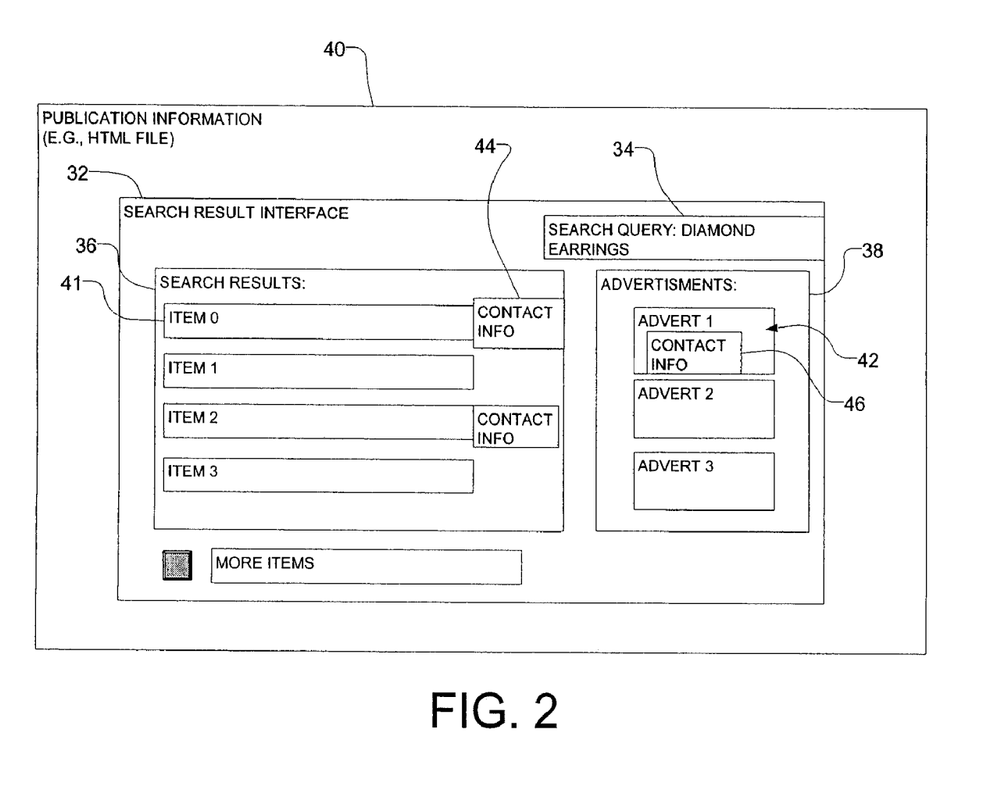
FIGS. 2 and 3 are search result interfaces according to embodiments.

The publication module 29 may be configured to publish information, such as listing information associated with the first entity, and may include the user interface generator 31 configured to electronically publish the listing information in association with communication initiation information (such as contact information 44 of FIG. 2). The information may be published at information 40 in the computer system 10, as discussed in more detail below.

In FIG. 1, in a specific example embodiment, the publication system 16 includes the search sub-system 37 through which a user may submit a search query to the publication system 16. The publication system 16 may provide search results in response, the search results pertaining to information (e.g., publication data) stored by the publication system 16 at database 23 or accessible at other computer systems via the network 14. For example, the viewing user 12, utilizing the browser application 13, may navigate to a search input interface presented by the publication system 16 through the search subsystem 37, and input a search query (e.g., diamond earrings). The search query may be communicated to the publication system 16 via the network 14 and/or may be communicated to the network 14 via the system 16. Responsive to the search query, the publication system 16 may generate at generator 31, and communicate to the computer system 10, a user interface in the form of an HTML file 40 that embodies the search results. The HTML file 40 may be sent to the computer system 10 as an HTTP communication for display by the browser application 13 or may, for example, be embodied in an email message sent to an email client that may execute on the computer system 10. In other embodiments, the communication from the publication system 16 to the computer system 10 may be formatted as XHTML, WML, XML files or a file utilizing other descriptor language formats.

The user interface generator 31 is configured to generate a user interface of publication information 40 to electronically publish the listing information in association with communication initiation information. The communication initiation information may include identification information (e.g., a link) to identify a contact module 22 of the first entity as discussed in more detail herein. The communication initiation information (e.g., the link) may be selectable to initiate a communication from the second entity (e.g., a viewing user) to the first entity (e.g., a publishing user) regarding, for example, the listing information of the first entity. The user interface generator 31 generates the HTML file 40 to include contact information (e.g., communication initiation information) that are displayed in association with appropriate instances of published information. The HTML file 40 is communicated via the network 14 to the computer system 10 for display by the browser application 13.

In one embodiment, the contact information 44 (e.g., link) includes identification information in the form of a VoIP address or IM address, which may be retrieved from table 50 of database 23, as well as an instruction to invoke the VoIP module or IM module, which may or may not be resident on the computer system 10. Other possible contact modules are illustrated and discussed herein.

The communication system 24 is connected to the network 14 to facilitate communication between the first entity 12 and second entity 20. The communication system 24 includes a communication module 25, a transceiving/transmitting module 26 to communicate with the transceiver of the publication system 16, and a tracking module 27 to store information in a database 28. The communication module 25 facilitates communication between the entities via the contact module 22 upon selection of the communication initiation information in the generated user interface 40. The communication system 24 tracks the communication between the entities as a lead data record. The communication system sends the lead data record to the transceiving module 35 of the publication system 16. The transceiving module 35 is configured to receive the lead data record from the communication system 24 and to send the lead data record for storage in the database 23. The lead data record is sent to the fee assessment module 39 for processing to assesses a fee to the first entity based on the lead data record. The fee assessment module 39 may receive the lead data record from the database 23 or directly from the transceiving module 35.

The fee assessment module 39 may, for instance, assess different fees based on several factors, including profile of the first entity, profile of the second entity, pre-populated information transmitted with a communication, contact module type selected, contact module features selected (number of contact modules offered in search results and prominence of contact module, e.g., bold or highlight), and other factors that may influence the likelihood of selection of the contact module and purchase of products and/or services of the first entity by the second entity.

The contact module type may be selected from a group including a voice over internet protocol (VoIP) contact module, an electronic message contact module, a telephone number contact module (e.g., toll-free or local to the second entity), a URL contact module, and an instant messaging contact module, for instance.

In one embodiment, the communication initiation information may include identification information (e.g., call identifier, URL, etc.) that identifies the contact module (e.g., voice over internet protocol (VoIP) module, browser application, instant messaging module, electronic message module, web page, or other contact module) and/or a network address of the second party (e.g., a hypertext link, a Voice over IP network address, a phone number, an instant messaging (IM) network address, an email address, web address, or other network address). In one embodiment, the communication system 24 opens a selection-associated communication user interface upon selection of the communication initiation information on the user interface 40 of the publication module 29 (for example, the SKYPE® interface is opened on the system 10).

The communication module 25 may send, to the first entity, information regarding the second entity, e.g., pre-populating the second entity with relevant information. The information sent may be selected from a group including reputation or feedback information, previous purchase categories and habits, previous selling categories and habits, demographic information, contact information, and system user identification. The information may be accessed by the module 25 from the database 23, from the database 28, or from the network 14.

The user interface generator 31 may associate the communication initiation information of the first entity with a relevant term in the publication data, such as the search term. For example, where the communication initiation information includes identification information that includes a hypertext link, the identified term (e.g. "iPod" or "Zen") may be hypertext linked to a website operated by a relevant merchant or service provider. Similarly, where the communication initiation information includes identification information that includes a VoIP module, the identified term may be associated with a URL that may be used to invoke the VoIP module to initiate a call to the relevant merchant or service provider. In this way, when the publication data is displayed to a viewing user 12 (e.g., a second entity), the viewing user 12 may select the identified term (or an icon associated at the relevant term) to initiate communications with the first entity 18. Again, these communications may be a web session, a VoIP session, an IM session or an email communication, for example.

The tracking module 27 tracks the communication and the selected communication type between the entities as a lead data record in the database 28. The tracking module 27 tracks a beginning time for the communication between the entities, an ending time, and a contact module type. The transmitting module 26 sends the lead data record to the publication system 16 for fee assessment, as discussed herein.

As shown in FIG. 2, the HTML file 40 may be rendered by the browser application 13 to generate a search result interface 32, which is displayed by the computer system 10 to the viewing user 12. The example search result interface 32 is shown to display an original search query 34 responsive to which the search results were generated, a number of search results 36, and paid-placement advertisements 38. The publication system user interface 40 may include contact information 44 (e.g., communication initiation information) associated with a search result 41 (e.g., publication information). Contact information 44, such as communication initiation information in the form of a contact information or link (e.g., a "call" button), may be associated with the search result instance 41, and similarly, contact information 46 may be associated with advertisement 42. In each instance, the relevant information (e.g., link) is rendered, by the browser application 13, in association with either the search result instance or the advertisement as a result of the inclusion within or insertion into the HTML file 40 of appropriate coding.

The publication system user interface 40 may include the communication initiation information (contact information 44) associated with the publication information (e.g., search result 41). In an example embodiment, in addition to including a hypertext-link in a search result instance (or an advertisement) in the HTML file 40, communication initiation information (e.g., a selectable text or some other selectable character, such as icon) may be associated with a search result instance (or an advertisement). The selectable text may be user-selectable or machine-selectable to invoke the contact module 22 to initiate an appropriate communication session utilizing information embedded in the HTML file 40.

Turning now to operations that occur at the computer system 10, when a viewing user 12 is presented with the search result interface 32, the viewing user 12 may click and select a communication link (e.g., button 44 or button 46). User selection of the contact module link is detected by the browser application 13, and the underlying instruction and contact module address are processed. In one embodiment, the link (e.g., the communication initiation information) may include identification information in the form of a universal resource locater (e.g., network address) that instructs the browser application 13 as to the identity and/or location of the contact module (e.g., VoIP module) on the client computer. Further, the identification information may also include parameters that are passed by the browser application 13 to the contact module 22, the parameters including a network address of the computer system 18 or the publishing user 20 and other parameters that may facilitate communication. In the present example, the link may be a call link, and responsive to the relevant instruction, the browser application 13 may invoke the VoIP module, and may communicate the VoIP address of the publishing user 20 to the VoIP module. The VoIP module then proceeds to initiate a VoIP call (e.g., to a telephone number or to a further VoIP module executing on another computer system 18). In this manner, the viewing user 12 is conveniently able to initiate communications with the publishing user 20. Similarly, other contact modules may be used to conveniently initiate communications, as discussed herein.

Communication initiation information for multiple entities may be associated with a search term (or terms) of publication data. For example, where a search term for an entity within a predetermined proximity is entered into the search query 34, the identification information for a number of entities may be displayed as items 41 in the search results 36 of the search result interface 32, as shown in FIG. 2. The displayed information may include contact initiation information 44 for each of the entities (e.g., telephone numbers, addresses, etc.) and communication initiation information 44 associated with the respective entities (e.g., links). The user may then initiate communications with one or more of the entities by selecting the user selectable icon (or a link) associated with the communication initiation information to invoke the appropriate contact module (e.g., VoIP module) that is associated with the respective entity.

Figure 3:
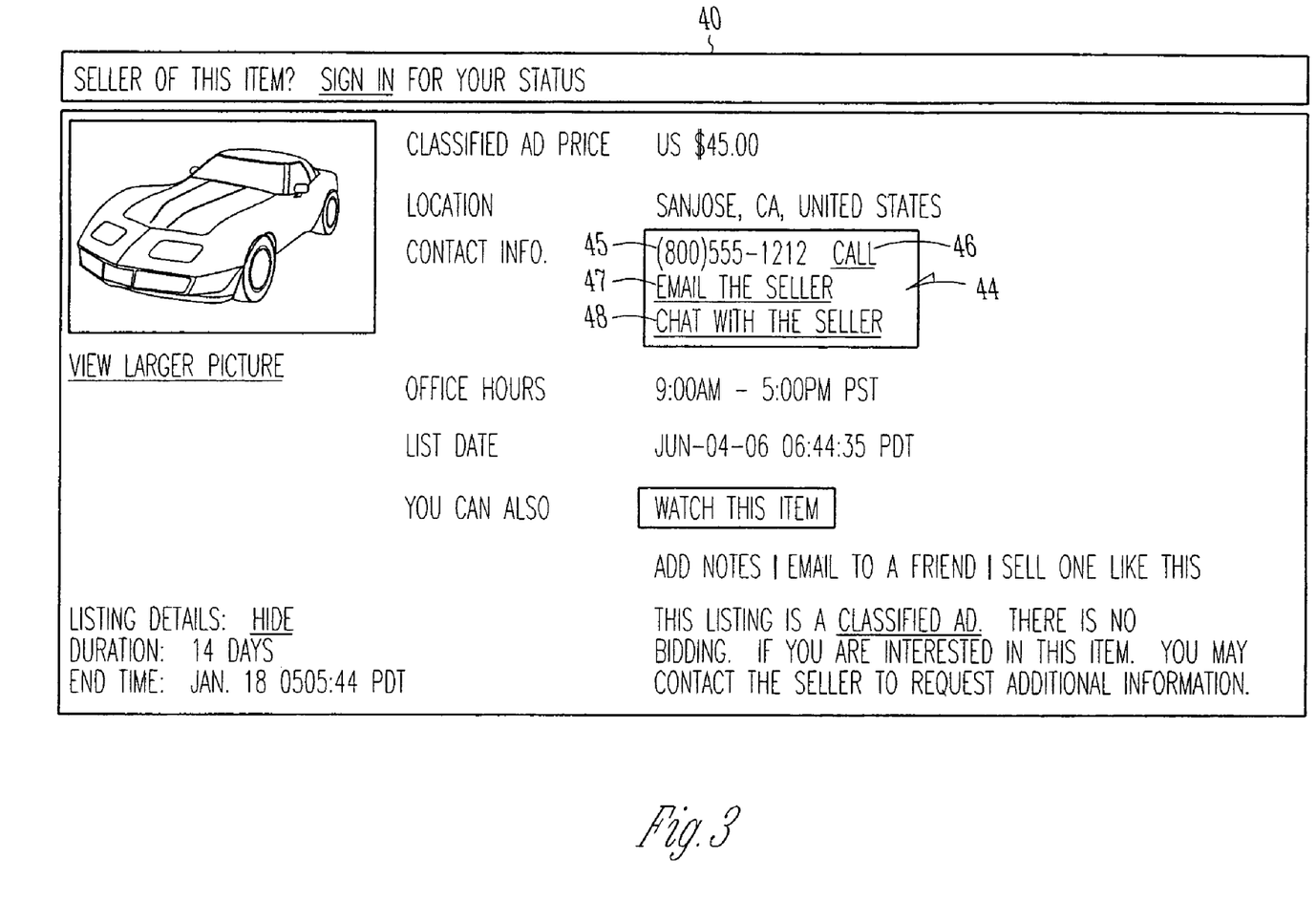

As shown in the examples of FIGS. 2 and 3, the contact information 44 (e.g., communication initiation information) is selected from a group including a telephone number 45 (e.g., toll-free or local to the second entity), an electronic mail link 47, a instant messaging link 48, a URL link, and a telephone call link 46.

When the selected communication initiation information of the displayed contact information includes the telephone number 45, the second entity places a call from a standard line, either a land-line, a mobile line, thru Skype, or another appropriate medium, to the number that may be assigned to the first entity by the publication system. The number routes the call to the communication module 25 of the communication system 24. The tracking module logs the call communication, and the communication module 25 then transfers the call to a separate pre-identified telephone number associated with the first entity, e.g., dialing the number of the first entity and patching the call through.

When the selected communication initiation information includes the electronic mail link 47, the associated electronic mail address of the first entity may be at least initially hidden on the user interface from the second entity until selected. After selection, the email address may be displayed to the second entity, or the email address may be known when/if the first entity replies to the second entity. The email address may be a temporary address of the first entity, or may be an address associated with the communication module 25 that may forward the email to the email address of the first entity. The email may be forwarded automatically or at the direction from the communication module 25. The tracking module logs the email communication.

When the selected communication initiation information includes the instant messaging link 48, the associated instant messaging user identification name of the first entity may be at least initially hidden on the user interface from the second entity. After selection, the IM user ID may be displayed to the second entity. The IM address may be a temporary address of the first entity, or may be an address associated with the communication module 25 that may forward the message to the IM address of the first entity. The IM may be forwarded automatically or at the direction from the communication module 25. The tracking module logs the message communication.

When the selected communication initiation information includes the telephone call link 46, the communication system initiates a Voice Over Internet Protocol telephone call between the first and second entities. The direct telephone number of the first entity may be at least initially hidden on the user interface from the second entity. Again, the call may be routed through the communication module 25 to avoid letting the second entity have access to the direct line of the first entity. The VoIP phone number may be a temporary number associated with the first entity or may be a number associated with the communication module 25 that may forward the call to the number of the first entity. The call may be forwarded automatically or at the direction from the communication module 25. The tracking module logs the communication.

When the selected communication initiation information includes the URL link (not shown in FIG. 3), the associated URL may be at least initially hidden on the user interface from the second entity. Again, after selection, a new window may pop-up to reveal the website, and may reveal the URL, as well. The URL may be a temporary URL associated with the first entity or may be a URL associated with the communication module 25 that may route the second entity to the URL of the first entity. The communication may be routed to the new web page automatically or at the direction from the communication module 25. The tracking module logs the communication.

As shown in the examples of FIGS. 2 and 3, considering the search results 36 and the advertisements 38, text associated with each search result or advertisement is hypertext-linked to a location accessible via the network 14. For example, hypertext (e.g., a URL) associated with each search result or advertisement may reference a location on the publication system 16, or a location at another network domain accessible via the network 14. For example, consider that where search result instance 41 pertains to a product offering by merchant ABC. Text associated with the search result instance 41 may be hypertext-linked to a website operated by merchant ABC (e.g., www.merchantABC.com/products/product123). In this example, "merchantABC.com" represents a domain operated by the relevant merchant. Accordingly, user selection of the search result instance 41 may cause the browser application 13 to be redirected to the address "www.merchantABC.com/products/product123," where further details regarding the relevant product may be obtained and displayed within the browser application 13. Similarly, text associated with an advertisement 42 may be hypertext-linked to a location within a domain operated by a relevant merchant.

The coding associated with the contact information 44, in one embodiment, may be included in the HTML file 40 delivered to the computer system 10. In one embodiment, the information 44 is delivered if the entity, associated with the relevant publication data (e.g., a search result instance or the advertisement) has satisfied one or more criterion (e.g., has registered with a particular VoIP compatible service, or has registered with and/or provided payment to the publication system 16 for the inclusion of this publication enhancement). For example, when generating the HTML file 40, the publication system 16 may access the database 23, and more specifically the entity table 50 maintained within the database 23, to determine whether an entity associated with the publication data (e.g., a merchant) is registered with a particular contact module (e.g., has a Skype® User ID) or has made a payment to the publication system 16. Such a verification may be made for the inclusion of an instant messenger or VoIP call initiation feature in generated HTML files, such that the link for instant messenger and/or VoIP call initiation feature is displayed and presented to a user in association with publication information published on behalf of the relevant publishing user (e.g., the merchant). See, for example, FIG. 3, where both the seller-entity and the buyer-entity are registered to compatible instant messenger platforms, e.g., Skype®, and the "chat" link is prominently displayed for selection.

In yet a further embodiment, for each inclusion or insertion of communication initiation information in the HTML file 40 by the user interface generator 31, an appropriate record of inclusion of this communication initiation information within the publication data may be registered at the publication system 16 (e.g., within the entity table 50). In an embodiment, a first entity (e.g., selling on the publication system) may be charged a certain amount for inclusion of communication initiation information (e.g., links) and/or for inclusion of contact initiation information (e.g., addresses, direct phone numbers) in publication information that is published by the publication system 16.

Alternatively, or additionally, the first entity may be charged a certain amount for selection of one of the icons or links associated with the communication initiation information. The amount charged may depend upon the type of communication method/contact module chosen by the second entity and made available by the first entity.

Figure 4:
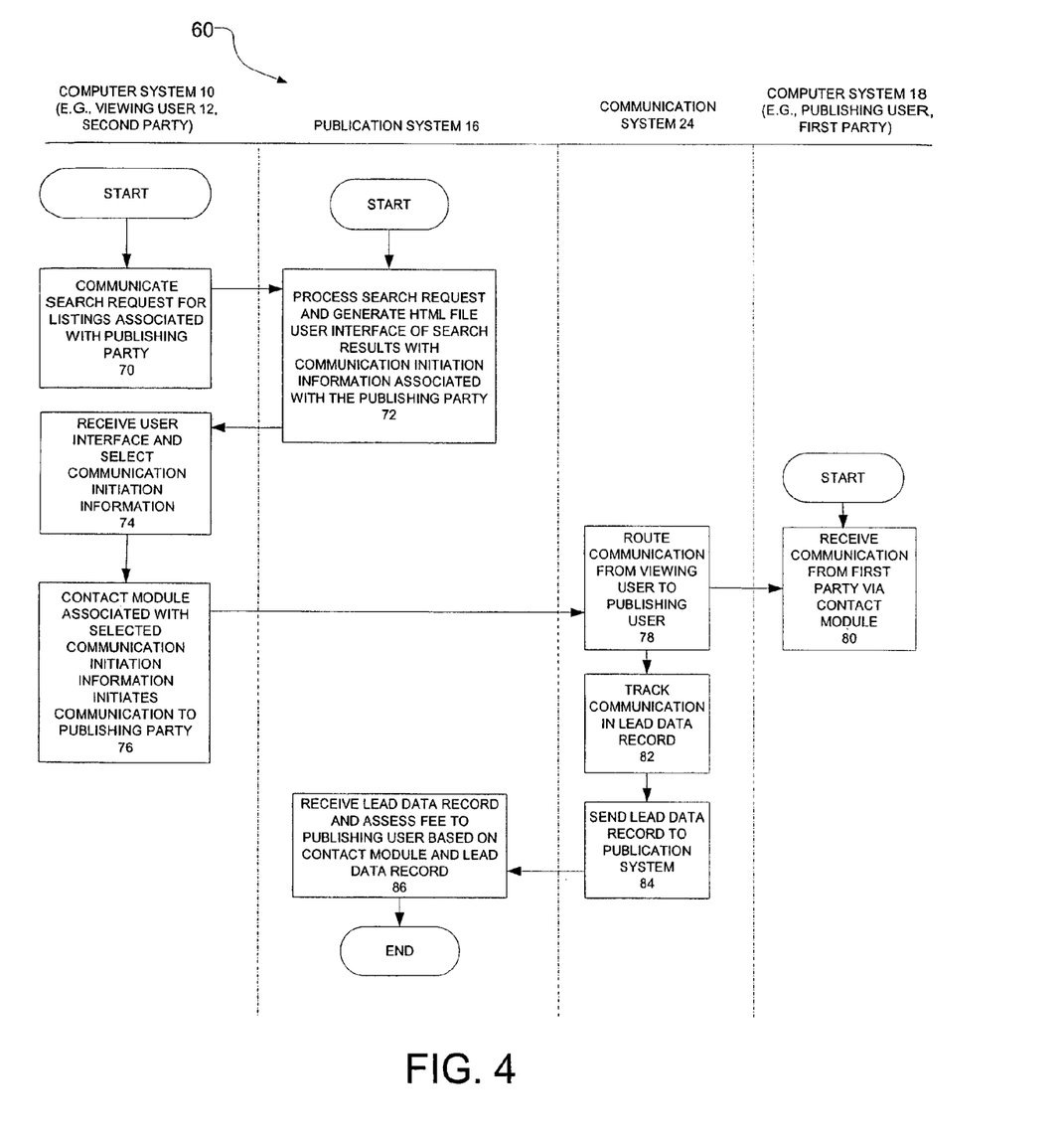
FIG. 4 is a block diagram illustrating a method associated with fee assessment for facilitation of communications, according to an embodiment.

FIG. 4 is a block diagram illustrating a method 60, according to an embodiment, to facilitate communication. Operations associated with the publication system 16, operations associated with a computer system 10 (e.g., second party), operations associated with the communication system 24, and operations associated with a computer system 18 (e.g., first party) are illustrated. The method 60 commences at operation 70 with a viewing user 12 at the computer system 10 communicating a search query to the publication system 16.

At operation 72, the publication system 16 receives the search query, generates search results in the form of the search result interface 32 that includes publication information. For example, the search result interface 32 may take the form of the HTML file 40 that includes publication information in the form of search result instances 40 and advertisements 38, and contact information 44 that each may be user selectable to select an associated contact module 22. The HTML file 40 may be a user interface. The publication system 16 may publish the results at the computer system 10.

At operation 74, at the system 10, the viewing user/system may view and/or receive the search result interface 32 and may select communication initiation information (e.g., links and/or direct contact information, depending upon the publishing user contact specifications) associated with the items 41 found in the search. The user interface generator 31 electronically publishes the publication information in association with communication information by inserting the links into the HTML file 40 and enabling the computer system 10 to have access to the HTML file 40. Further at the operation 72, the publication system 16 communicates the HTML file 40 to the computer system 10. In an example, the computer system 10 receives the HTML file 40 and displays the HTML file to the viewing user 12. The computer system 10 may display contact buttons 44 in association with the corresponding search result instances 40 and contact buttons 46 in association with corresponding advertisements 42. Further, at operation 74, the viewing user 12 may select a link (e.g., contact information 44 or 46) to initiate appropriate contact module communications with the publishing user 20.

In another embodiment, the publication system 18 may electronically publish the publication information in association with communication initiation information without first receiving a request for search results. In yet another embodiment, a client computer (e.g., computer system 18) may host the publication system and accordingly electronically publish the publication information in association with communication initiation information. For example, the computer system 18 may host the publication system and accordingly respond to search requests from the computer system 10, as well as responding to a request to establish a VoIP connection.

At operation 76, the contact module 22 of the system 10 may initiate communication between the viewing user and the publishing user. The communication may be initiated through means discussed herein, such as VoIP, email, instant message, a web site, or other contact modules. The selected contact module is loaded on the system 10 for connection to the publishing user. In an example, the browser application 13, responsive to the selection of a link, invokes a VoIP module which initiates a communication in the form of a VoIP telephone call to the publishing user 20 at the computer system 18. In this instance, a VoIP contact module is opened at the system 10, such as Skype®. There may be a URL link utilized to invoke or download the VoIP contact module to the system 10 if not already present on the system 10.

Operation 76 is optional, for example, if a direct contact is made by the second party to the first party, the contact module 22 may not be initiated (e.g., the second party directly calls or emails the first party using the posted direct contact information).

At operation 78, the communication system 24 routes the communication through the contact module 22 from the viewing/searching user to the publishing user. In the instance of the assigned telephone number, the communication system 24 receives the call and routes the call to a direct line of the publishing user.

At operation 80, at the publishing user, a communication via the contact module is received. At the computer system 18, a VoIP module may respond to the received communication by generating an audible ringing sound that may be heard by the publishing user 20, for instance. Further, the VoIP module may respond to a publishing user 20 that answers the call by establishing a VoIP connection with the viewing user 12.

At operation 82, at the communication system 24, the communication between the publishing user and the viewing user is tracked in a database as lead data record. For instance, the beginning and ending time of the communication, as well as the contact medium (e.g., VoIP), may be tracked.

At operation 84, the lead data record is sent to the publication system 16.

At operation 86, the publication system 16, upon receipt of the lead data record, assesses an appropriate fee to the publishing user based on the lead data record, as discussed herein.

Criteria for which a fee may be assessed may include which contact module (e.g., IM or e-mail) was selected by the second entity, whether the communication (e.g., IM session) exceeded a pre-set time duration, whether the communication session exceeded a pre-set number of messages, and whether a reply is sent by the first entity in response to an initial message. Characteristics of the session may be monitored to determine whether the contact (e.g., second entity) constitutes a qualified lead. For example, a teleconference or IM session that is initiated but that is not received or that does not contain any content may not be recognized as a qualified lead in some embodiments. In other embodiments, the duration of the teleconference or videoconference must be a minimum length, such as five or ten seconds, for the lead to constitute a qualified lead. Similarly, where contact between a potential customer and a third-party vendor takes another form such as e-mail, the content, delivery, and length of the e-mail can be used to determine whether the lead is a qualified lead. For example, an e-mail message that has no content, or that contains fewer than ten characters, may be ignored and not considered a qualified lead. Similarly, an e-mail that can't be delivered, doesn't contain appropriate customer contact information, or that is from the same potential customer as another qualified lead can be ignored as a lead that is not qualified for payment on a pay-per-lead basis.

The publication system may notify the first entity that a message was just received from the second entity. The publication system may only pass part of the lead, for example, non-identifiable lead information, to the first entity. Just a query, for example, 'do you have this car in red?', may be passed along without contact information from the message sender. The publication system may, instead of charging the entity for the lead, enquire as to whether the first entity may be willing to pay a fee for receiving contact information of the message sender. The first entity may then make a more informed decision about some of the leads they may pay for.

Figure 5:
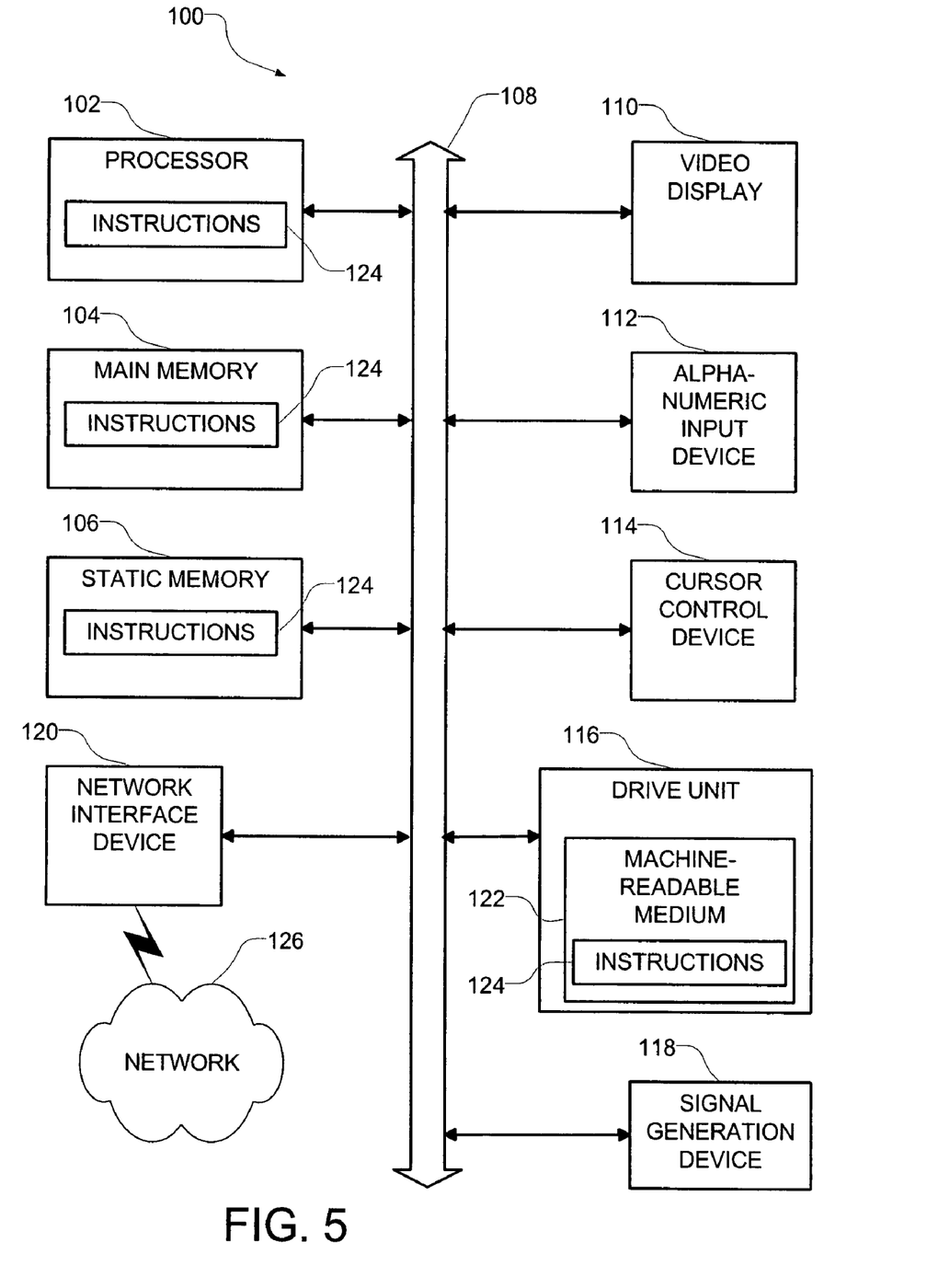
FIG. 5 shows a diagrammatic representation of machine in the example form of a computer system within which a set of instructions, for causing the machine to perform any one or more of the methodologies discussed herein, may be executed.

FIG. 5 shows a diagrammatic representation of a machine in the form of a computer system 100 within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a television, a Personal Digital Assistant (PDA), a cellular (or mobile) telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 100 includes a processor 102 (e.g., a central processing unit (CPU), a graphics processing unit (GPU) or both), a main memory 104 and a static memory 106, which communicate with each other via a bus 108. The computer system 100 may further include a video display unit 110 (e.g., a liquid crystal display (LCD) or a cathode ray tube (CRT)). The computer system 100 also includes an alphanumeric input device 112 (e.g., a keyboard), a user interface (UI) navigation device 114 (e.g., a mouse), a disk drive unit 116, a signal generation device 118 (e.g., a speaker) and a network interface device 120.

The disk drive unit 116 includes a machine-readable medium 122 on which is stored one or more sets of instructions and data structures (e.g., software 124) embodying or utilized by any one or more of the methodologies or functions described herein. The software 124 may also reside, completely or at least partially, within the main memory 104 and/or within the processor 102 during execution thereof by the computer system 100, the main memory 104 and the processor 102 also constituting machine-readable media.

The software 124 may further be transmitted or received over a network 126 via the network interface device 120 utilizing any one of a number of well-known transfer protocols (e.g., HTTP).

While the machine-readable medium 122 is shown in an embodiment to be a single medium, the term "machine readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform anyone or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

Embodiments listed herein may include listings on the publication system 16 other than auction-format listings, or may include "off-platform" listings, services listings, classifieds listings, personal listings, non-transactional listings, and/or highly configurable listings.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. The various modules as described herein may be implemented as software and/or hardware. Thus, the term "module" may include an independent piece of software which forms part of one or more larger programs. Additionally or alternatively, the term "module" may include a circuit (or part thereof) consisting of an assembly of electronic components (e.g., computer hardware).

Although an embodiment has been described with reference to specific example embodiments, it may be evident that various modifications and changes may be made to these embodiments without departing from the broader spirit and scope of the disclosure. Accordingly, the specification and drawings are to be regarded in an illustrative rather than a restrictive sense.

What is claimed is:

1. An electronic publication system comprising:
 a processor configured to execute a publication module configured to generate a user interface based on an information search,
  the user interface including search result information associated with a first entity and communication initiation information associated with the first entity,
  the communication initiation information including identification information configured to identify a first contact module at a first computer system of the first entity,
  the first contact module having a contact module type,
  the communication initiation information being selectable to facilitate a communication between the first contact module and a second contact module at a second computer system of a second entity;
 a receiving module configured to receive a lead data record from a communication system that facilitates the communication between the first contact module and the second contact module upon selection of the communication initiation information; and
 a fee assessment module configured to receive the lead data record from the receiving module and to assess a fee to the first entity based on the lead data record and on the contact module type of the identified first contact module at the first computer system of the first entity.

2. The system of claim 1, wherein the communication initiation information includes at least one of an electronic mail link, a instant messaging link, or a telephone call link.

3. The system of claim 2, wherein the communication initiation information includes the electronic mail link, and upon selection of thereof, an associated electronic mail address of the first entity is at least initially hidden on the user interlace from the second entity.

4. The system of claim 2, wherein the communication initiation information includes the instant messaging link, and upon selection thereof, an associated instant messaging user identification name of the first entity is at least initially hidden on the user interface from the second entity.

5. The system of claim 2, wherein the communication initiation information includes the telephone call link, and upon selection thereof, the communication system initiates a Voice Over Internet Protocol telephone call between the first and second entities, wherein an associated telephone number of the first entity is at least initially hidden on the user interface from the second entity.

6. The system of claim 2, wherein the communication system is configured to open the second contact module at a system of the second entity upon selection the communication initiation information on the user interface.

7. A communication system comprising:
 a processor configured to execute a communication module configured to facilitate a communication between a first contact module at a first computer system of a first entity and a second contact module at a second computer system of a second entity upon selection by the second entity of communication initiation information associated with the first entity,
  the communication initiation information being included in a user interface that includes search result information associated with the first entity,
  the communication initiation information including identification information configured to identify the first contact module,
  the first contact module having a contact module type;
 a tracking module configured to track the communication between the first contact module and the second contact module, and to track the contact module type of the first as a lead data record; and
 a transmitting module configured to send the lead data record to a publication system as a basis for assessing a fee to the first entity,
  the fee being based on the contact module type of the first contact module at the first computer system of the first entity.

8. The system of claim 7, wherein the communication module is configured to send, to the first entity, information regarding the second entity, wherein the information regarding the second entity includes at least one of feedback information, previous purchase categories, demographic information, contact information, or system user identification.

9. The system of claim 7, wherein the tracking module is configured to track a beginning time for the communication between the first contact module and the second contact module and an ending time for the communication, and wherein the contact module type is selected from a group consisting of a Voice over Internet Protocol (VoIP) contact module, an electronic message contact module, and an instant messaging contact module.

10. A method comprising:
 electronically publishing a user interface having search result information associated with a first entity,
  the user interface including communication initiation information associated with the first entity and the search result information,
  the communication initiation information including identification information configured to identify a first contact module at a first computer system of the first entity,
  the first contact module having a contact module type,
  the communication initiation information being selectable to facilitate a communication between the first contact module and a second contact module at a second computer system of a second entity;
 receiving a lead data record from a communication system that facilitates the communication between the first contact module and the second contact module upon selection of the communication initiation information; and assessing a fee to the first entity based on the lead data record and on the contact module type of the identified first contact module at the first computer system of the first entity.

11. The method of claim 10 wherein the communication initiation information includes at least one of an electronic mail link, a instant messaging link, or a telephone call link.

12. The method of claim 11 wherein the communication initiation information includes the electronic mail link; and upon selection thereof, an associated electronic mail address of the first entity is at least initially hidden on the user interface from the second entity.

13. The method of claim 11 wherein the communication initiation information includes the instant messaging link, and upon selection thereof, an associated instant messaging user identification name of the first entity is at least initially hidden on the user interface from the second entity.

14. The method of claim 11 wherein the communication initiation information includes the telephone call link, and upon selection thereof, the communication system initiates a Voice over Internet Protocol telephone call between the first and second entities, wherein an associated telephone number of the first entity is at least initially hidden on the user interface from the second entity.

15. The method of claim 10, wherein the communication system opens the second contact module upon selection of the communication initiation information on the user interface.

16. A method comprising:
facilitating a communication between a first contact module at a first computer system of a first entity and a second contact module at a second computer system of a second entity upon selection by the second entity of communication initiation information associated with the first entity,
the communication initiation information being included in a user interface that includes the search result information associated with the first entity,
the communication initiation information including identification information configured to identify the first contact module at the first computer system of the first entity,
the first contact module having a contact module type;
tracking the communication between the first contact module and the second contact module, and tracking the contact module type of the first contact module as a lead data record; and
sending the lead data record to a publication system as a basis for assessing a fee to the first entity, the fee being based on the contact module type of the first contact module the first computer system of the first entity.

17. The method of claim 16, further comprising sending the first entity information regarding the second entity, wherein the information regarding the second entity includes at least one of feedback information, previous purchase categories, demographic information, contact information, or system user identification.

18. The method of claim 16, wherein the tracking of the communication includes tracking a beginning time for the communication between the first contact module of the first entity and the second contact module of the second entity and an ending time for the communication, and wherein the contact module type is selected from a group consisting of a Voice over Internet Protocol contact module, an electronic message contact module, and an instant messaging contact module.

19. A non-transitory tangible machine-readable medium storing a set of instructions that, when executed by a machine, cause the machine to perform operations comprising:
electronically publishing a user interface based on an information search,
the user interface having search result information associated with a first entity and communication initiation information associated with the first entity and the search result information,
the communication initiation information including identification information configured to identify a first contact module at a first computer system of the first entity,
the first contact module having a contact module type,
the communication initiation information being selectable to facilitate a communication between the first contact module and a second contact module at a second computer system of a second entity;
receiving a lead data record from a communication system that facilitates the communication between the first contact module and the second contact module upon selection of the communication initiation information; and
assessing a fee to the first entity based on the lead data record and on the contact module type of the identified first contact module at the first computer system of the first entity.

20. The non-transitory tangible machine-readable medium of claim 19 wherein the communication initiation information includes at least one of an electronic mail link, a instant messaging link, or a telephone call link.

21. A system comprising:
means for generating a user interface based on an information search,
the user interface including search result information associated with a first entity and communication initiation information associated with the first entity,
the communication initiation information including identification information configured to identify a first contact module at a first computer system of the first entity, the first contact module having a contact module type,
the communication initiation information being selectable to facilitate a communication between the first contact module and a second contact module at a second computer system of the second entity;
a receiving module configured to receive a lead data record from a communication system that facilitates the communication between the first contact module and the second contact module upon selection of the communication initiation information; and
a fee assessment module configured to receive the lead data record from the receiving module and to assess a fee to the first entity based on the lead data record and on the contact module type of the identified first contact module at the first computer system of the first entity.

22. The system of claim 21 wherein the communication initiation information includes at least one of an electronic mail link, a instant messaging link, or a telephone call link.

* * * * *

UNITED STATES PATENT AND TRADEMARK OFFICE
CERTIFICATE OF CORRECTION

PATENT NO. : 8,266,533 B2  Page 1 of 1
APPLICATION NO. : 11/744349
DATED : September 11, 2012
INVENTOR(S) : Zacarias et al.

It is certified that error appears in the above-identified patent and that said Letters Patent is hereby corrected as shown below:

In the Specification

In column 1, line 57, delete "A" and insert --a--, therefor

In the Claims

In column 11, line 59, in Claim 3, delete "interlace" and insert --interface--, therefor In column 12, line 7, in Claim 6, after "selection" insert --of--, therefor

In column 12, line 26, in Claim 7, after "first" insert --contact module--, therefor In column 12, line 43, in Claim 9, delete "communication," and insert --communication;--, therefor In column 13, line 10, in Claim 12, delete "link;" and insert --link,--, therefor In column 13, line 50, in Claim 16, after "module", insert --at--, therefor Signed and Sealed this
Ninth Day of December, 2014

Michelle K. Lee
*Deputy Director of the United States Patent and Trademark Office*